United States Patent [19]

Ooraikul

[11] 4,110,478

[45] * Aug. 29, 1978

[54] PRODUCTION OF POTATO GRANULES

[75] Inventor: Buncha Ooraikul, Edmonton, Canada

[73] Assignee: Canadian Patents and Development Limited, Ottawa, Canada

[ * ] Notice: The portion of the term of this patent subsequent to Feb. 8, 1994, has been disclaimed.

[21] Appl. No.: 750,164

[22] Filed: Dec. 13, 1976

Related U.S. Application Data

[63] Continuation-in-part of Ser. No. 476,053, Jun. 3, 1974, Pat. No. 4,007,286.

[51] Int. Cl.² ............................................... A23B 7/14
[52] U.S. Cl. .................................. 426/262; 426/271; 426/444; 426/544; 426/637
[58] Field of Search .............. 426/637, 271, 262, 388, 426/444, 465, 466, 544, 464

[56] References Cited

U.S. PATENT DOCUMENTS

| 2,564,296 | 8/1951 | Bostock | 426/464 |
| 3,009,816 | 11/1961 | Hendel | 426/464 |
| 3,031,314 | 4/1962 | Hendel et al. | 426/464 |
| 4,007,286 | 2/1977 | Ooraikul | 426/637 |

*Primary Examiner*—Raymond N. Jones
*Assistant Examiner*—C. A. Fan
*Attorney, Agent, or Firm*—Fisher, Christen & Sabol

[57] ABSTRACT

Dehydrated potato granules are prepared by subjecting potato pieces to cooking, mashing, freezing, thawing, predrying to a moisture content of 35 to 45 percent, granulating and finally drying the product to a moisture content of not more than about 7%.

24 Claims, 1 Drawing Figure

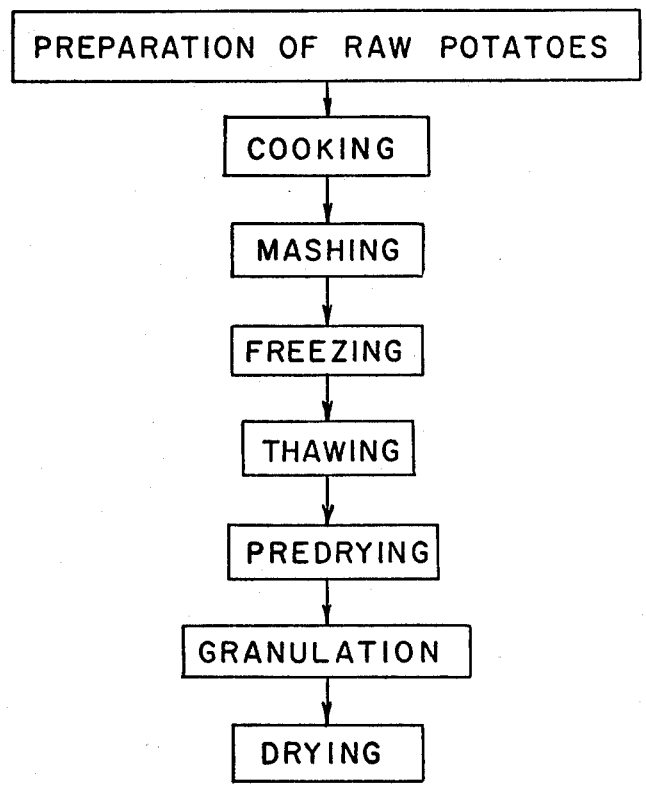

PRODUCTION OF POTATO GRANULES

CROSS-REFERENCE TO RELATED APPLICATION

This application is a continuation-in-part of my application Ser. No. 476,053, filed June 3, 1974 now U.S. Pat. No. 4,007,286.

BACKGROUND OF THE INVENTION

This invention relates to improved dehydrated potato granules and to a process for the preparation of these granules.

The process now generally in use for the production of pre-cooked dehydrated potato pieces is commonly referred to as the "add-back" process. This name derives from the main distinguishing feature of the process which is that a large proportion of the final dried potato product is recycled and mash-mixed with freshly cooked potatoes. Various subsidiary steps, each essential to the particular process, as, for example, pre-cooling or conditioning, may intervene at one point or another. At any rate, the recycling and mash-mix technique serves to reduce the moisture content of the mixture down to about 35% and to subdivide the cooked potato tissue into fine granules. The mixture is subsequently dried in dryers which might typically consist of an air-lift dryer and/or fluidized bed dryer.

In the above described processes, about 85-90% of the dried product is required to be "added-back" for mixing with freshly cooked potatoes. Hence, only 10-15% of the total process throughput is packed as a final product.

"Add-back" processes are marked by a number of distinct disadvantages. Perhaps the most obvious of these is that, due to the high recycle rate, the processing equipment is required to be, relatively very large. In addition, any given quantity of potatoes passing through the system is subjected to mash-mixing, conditioning, final granulation and any other operations which may be present in the system, on an average of 6-10 times before packing. This also is a direct result of the high recycle rate. These repetitive treatments may result in cell damage due both to mechanical breakage and to repeated exposure to high temperature. Common manifestations of such damage are that the reconstituted product may have an undesirable gluey texture and a scorched or burnt flavour, and be of reduced nutritional value particularly with respect to more heat sensitive components, in particular ascorbic acid (Vitamin C).

A further troublesome problem stemming from high recycle rate is that a batch of potatoes that was defective before entering the process, or a quantity that was rendered defective by poor control, etc., will continue to contaminate new batches for a lengthy period. Associated with this problem is that of build up, where the high amount of recycle can result in the creation of concentrations of undesirable elements, for example, bacteria.

In addition to problems associated with recycle, "add-back" processes often involve a conditioning step following mix-mashing wherein the potato is subjected to a lengthy tempering period at a temperature such that microorganism activity and/or undesirable chemical reactions may occur resulting in such problems as discoloration.

With so many problems inherent in these systems, attempts have been made to devise processes which would improve the processing technique by employing a straight-through method with the elimination of recycling. Various systems have been proposed each with its distinguishing characteristics and also with a number of common features. Obviously, all will require steps such as cooking, drying and mashing. However, the arrangement of the common steps, the addition of new ones, the deletion of unwanted ones and the conditions under which each step is carried out, all serve to clearly set off each process from the others. In each case a new process is designed to improve the efficiency of operation while maintaining or improving the desirable characteristics of the product. On the other hand, each process proposed to date exhibits one or more undesirable characteristics, for example, in its effect on the physical or nutritional qualities of the product.

SUMMARY OF THE PRESENT INVENTION

The process of the present invention provides a new method wherein the overall effect of the process is to cause very little damage to either the physical or nutritional properties of the product. In addition, the process results in very little discard or recycling. The present invention provides dehydrated potato granules having improved characteristics and a method for the preparation of dehydrated potato granules which comprises subjecting potatoes to the following steps in order:

(a) preparing the potatoes for cooking; optionally including subdividing the potatoes;

(b) cooking the prepared potatoes;

(c) if necessary, immediately mashing the cooked potatoes at a temperature of at least 160° F.;

(d) cooling and freezing the resulting material;

(e) thawing the material;

(f) immediately predrying the thawed material by evaporation to reduce the moisture content to a range of about 35–46%, thereby producing potato cells which are separated into single units or cell aggregates;

(g) thereafter granulating the predryed material under conditions such that the moisture content remains within the range specified in step (f) during the entire granulating operation; and (h) drying the potato granules at a temperature and for a period of time to reduce the moisture content to note more than about 7%.

If the step of preparing the poratoes for cooking includes subdivision, e.g. dicing or slicing, then a formal mashing step (c) following cooking may be unnecessary.

It is an advantage in this type of process that the time between thawing and the beginning of predrying be kept as short as possible. This is facilitated by carrying out a mashing step before freezing. As the material freezes, pure ice crystals form in the intercellular spaces and hence the intercellular liquid becomes more concentrated. The result of this is that the moisture inside the cells passes through the cell walls by osmosis. Hence, when the material is thawed most of the liquid is between the cells. It follows that if predrying is begun immediately, the quantity of water that will diffuse back into the cells is kept to a minimum. This is very useful since the moisture can be evaporated much more quickly outside the cells than within. Up to 80% of the initial water in the potato can be removed in this manner.

The freezing and thawing steps are of importance also since the effect of the steps is to toughen the potato cells so that they can withstand mild mechanical force during predrying and relatively rigorous mechanical force during the short granulation step, without sustaining more than minor damage.

The product has a high proportion of −60 mesh particles, normally not less than 85%, and very little discard, normally less than 1%. The intermediate size particles which normally comprise not more than 15% of the product can be recycled into the predrying step without any ill effect.

Irrespective of the types of potatoes used in the process, the reconstitution ratio of the product is substantially constant at about 1:4 (granules:water). The reconstituted product gives firm, mealy mashed potatoes with flavour and texture resembling very closely those of freshly cooked and mashed potatoes.

During processing, the potato material is kept normally at low temperature with no lengthy tempering period. Hence the product would be expected to retain most of the original nutritional value of the potatoes.

DETAILED DESCRIPTION OF THE PREFERRED EMBODIMENTS

The operation of the process may be conveniently explained by reference to the various processing steps as illustrated in FIG. 1.

In step (a) the potatoes are prepared for cooking. This may comprise peeling, cutting, washing, together with sulphiting, if desired. While sulphiting is not essential to the success of the process, it may advantageously be added at this stage as is the normal industrial practice in such processes. If sulphiting is carried out, it is preferably done by soaking the washed potato pieces for about 5 minutes in a sodium bisulphite solution. This sulphite addition inhibits enzymatic browning before cooking and also contributes to the total sulphite in the final product.

Step (b) is the cooking step wherein the potatoes are cooked in any conventional manner such as in an atmospheric steam cooker or in water.

Step (c) in the process comprises mashing the potatoes. This step is optional if step (a) has included subdivision, but where utilized, it is carried out as soon as possible after cooking and while the potato pieces are still at a temperature above about 160° F. When mashing is carried out above this temperature, the proportion of broken cells is small, and the amount of free starch released from broken cells is well below the level that would yield an undersirably doughy or pasty product on reconstitution. The mashing operation can be advantageously carried out in an enclosed system in order to reduce evaporative cooling of the material. The mashing may be carried out using any conventional apparatus, provided only that the mashing does not cause excessive cell damage.

During mashing additional sulphite may be added to bring the total sulphite in the final product up to some value required by the subsequent user of the granules. The total sulphite in the product affects shelf life by inhibiting non-enzymatic browning and microbial growth. Hence, for example, the U.S. military authorities require a sulphite level of 400 ppm in the product in order that it be acceptable to them. On the other hand, Japanese regulatory agencies require a sulphite level of less than 30 ppm together with a very low bacterial plate count. In this situation, the sulphite addition would be minimal, if any.

This latter discussion underlines a distinct advantage of the present process. Because the process is straightthrough, build up of undersirable enzymatic and microbial activity is reduced, and a combination of low sulphite count and low plate count can be achieved.

Also at the mashing stage, a surfactant may be added. Addition at this stage ensures a good distribution through the product. A preferred amount of surfactant is from about 0.15 to about 0.3% of the weight of the cooked potato. The surfactant has the effect of improving the texture of the product by making it less gluey or sticky. This is due to the surfactant binding the water soluble free starch and pectic substances which are present in the cooked potato or are released from any cells which may be broken during processing. Surfactant could alternatively be added just prior to predrying.

In addition, certain other additives may be added in the mashing stage, if desired, These include chelating agents such as ethylene diamine tetraacetic acid (EDTA); or other substances such as sodium gluconate and sodium acid pyrophosphate, all of which help to prevent the appearance of after-cooking darkening. There may also be added, if desired, antioxidants such as butylated hydroxyanisole, butylated hydroxytoluene, propyl gallate, citric acid and/or other antioxidants, all of which help to prevent the occurrence of oxidative rancidity during storage of the dry product. It should be pointed out that where a formal mashing step is omitted, the various additives may be introduced at other suitable points in the process which will ensure an acceptable distribution.

Following step (c), freezing is carried out in step (d). If desired, the hot mash may be cooled before freezing in a separate step. Such a procedure is advantageous in that it reduces the load on the freezing apparatus. The potato mash is preferably frozen using circulating air at a temperature between about 0° F. and about −40° F.

Step (e) comprises thawing the potato mash. The operation is preferably carried out using circulating air at a temperature between about 40° F. and about 90° F., and continued only until the mash has just thawed completely. The mash temperature during this step should preferably be kept below about 50° F. Any conventional apparatus will be applicable to this step depending on quantity of mash to be thawed and other factors dictated by the particular application. The mash is then immediately transferred to the predrying step. The predrying step may, if desired, be started before the potato mash is completely thawed.

In step (f), predrying, the mash is partially dried by evaporation to reduce the moisture content to the range of about 35 to about 45%. This operation can be conveniently carried out in a stirred bed or similar type of dryer. As indicated above, by virtue of the freezing and thawing operations, the potatoes contain a larger proportion of moisture in the intercellular spaces. The mass can be dried quickly under a hot air stream while being slowly stirred. For example, while being stirred at a maximum lineal rate of 30–100 feet per minute the mash may be subjected to hot air at a temperature of 100°–300° F. having a superficial velocity of 250–500 feet per minute, for a period of 10–60 minutes. Under such conditions the temperature of the mash does not reach undesirable levels nor is there excessive cell damage. Furthermore, the rate of predrying is maintained throughout in the constant rate period. The term "constant" rate is well known in the art of food drying, and simply describes a drying period in which the rate of moisture loss is more or less constant over an appreciable portion of the total time involved. At the end of the predrying period the moisture content of the mash is in a range of from about 35 to about 46%, and the potato cells are well separated into single units or cell aggregates. In this range the cells are most resistant to physical damage, and are therefore in the most desirable condition for granulation.

An air classification apparatus can be advantageously used during the predrying and granulation stages. By the proper choice of air velocity the potato particles will be carried over continuously into a subsequent processing step at just the desired condition of the particles. Hence, the air velocity in the predrying step can be adjusted to carry over the potato particles into the granulation step just when they are in the critical range. In other words, the particles reach the granulator when the cells are most resistant to physical damage.

Granulation is effected in step (g) of the process. In this step it is desirable that the moisture content of the particles remain within the critical range for the entire operation, since, as indicated above, less damage will result to the physical structure of the cells under these conditions. This step is therefore carried out relatively quickly. The operation can be carried out effectively in a stirred-bed fluidizing unit using a high rate of stirring and a low air velocity. For example, while being stirred at a maximum lineal rate of 1000-1800 feet per minute, the potato granules may be subjected to air flow at a temperature of 100°-150° F. and a superficial velocity of 20-60 feet per minute for a period of preferably 5-15 minutes duration. A preferred air velocity is 35-45 feet per minute and a preferred maximum lineal stirrer speed is about 1400 feet per minute.

This granulation rate allows little change in moisture content so that the particles remain within the critical range.

The granules leaving the granulator usually consist of more than 80% of fine granules of smaller than 60 mesh and with not more than 2% of discard (greater than 18 mesh).

Step (h), the final processing step, drying, can be carried out in any conventional manner. For example, a batch fluidized bed may be used successfully. Other suitable types of apparatus are direct rotary dryer, screw conveyor dryer, or vibrating tray dryer.

The product thus produced shows an improved broken cell count and an improved Blue Value Index. The broken cell count is a measure of the percentage of broken cells in the product. This may be obtained by examining a suspension of iodine-stained cells under a microscope at 40 to 100X magnification, using the method of Reeve and Notter, Food Technol. 13 (10) 574–577 (1959), but with the addition of two drops of standard iodine solution to the suspension to cells on the microscope slide. The iodine solution is prepared by the method of Williams and Fegal, Cereal Chem. 46, 56–62 (1969). The product of the present invention is generally found to possess a broken cell count of not more than about 2%.

The Blue Value Index (BVI) is a measure of the free starch content of the product and may be obtained by the method of Mullins et al, *Food Technology*, v. 9, p. 393 (1955). BVI values for the product of the present invention have been obtained down to about 110 BVI units without the addition of a surfactant. Small amounts of a surfactant material substantially reduce the BVI. For example, the addition of 0.1% by weight of glycerol-monostearate at the mashing stage may reduce the BVI to approximately 60.

EXAMPLE

A batch of 2.5 kg of peeled, sliced, and washed Netted Gem potatoes containing 78.10% moisture was processed in each run. Each batch of the potatoes was subjected to processing steps (a) to (e) and (g) and (h) as described above, not during the predrying step (f) the moisture content of the potatoes was checked and varied prior to the granulation. This moisture content in the eight runs ranged from 50.49 to 30.10%. The results are tabulated in the following Table.

TABLE

| Run No. | % Moisture at granulation (wet basis) | % Discard (+18 mesh) | % Fine granules (−60 mesh) | Broken Cell Count (%) |
| --- | --- | --- | --- | --- |
| 1 | 50.49 | 9.66 | 50.97 | 4.0 |
| 2 | 47.00 | 3.47 | 69.71 | 2.0 |
| 3 | 45.00 | 1.15 | 82.78 | 1.0 |
| 4 | 43.50 | 1.43 | 86.40 | 2.0 |
| 5 | 39.20 | 2.00 | 87.61 | 1.5 |
| 6 | 34.50 | 1.81 | 75.04 | 2.5 |
| 7 | 33.00 | 2.19 | 72.47 | 8.0 |
| 8 | 30.10 | 2.89 | 49.79 | 18.0 |

From this Table it is apparent that, if the moisture content of the mash at granulation is higher than about 45% (wet basis), the result is unacceptably high discard (9.66% at 50.49% moisture and 3.47% at 47% moisture), inadequate fine granules (50.97% and 69.71% respectively, and relatively high broken cells (4% at 50.49% moisture).

Beyond the lower limit of the critical range of moisture, the results show some increase in the discard (runs 7 and 8), less fine granules (dropping from 87.61% in run 5 to 75.04% in run 6 to as low as 49.79% in run 8 where the granulation moisture content is 30.10% wet basis), and a spectacularly increased broken cell count to as high as 18% in run 8.

It is apparent then that the best results obtained were from runs 3 through 6 where the moisture content of the potatoes at the granulation stage ranged from 45 to 34.50%. In this moisture range the % discard was minimal (1.15 to 2.00%), the % fine granules was high (75.04 to 87.61%), and the % broken cells was low (1.0 to 2.5%).

I claim:

1. A method for the preparation of dehydrated potato granules which comprises subjecting potatoes to the following steps in order:
    (a) preparing the potatoes for cooking;
    (b) cooking the prepared potatoes;
    (c) immediately mashing the cooked potatoes at a temperature of at least 160° F;
    (d) cooling and freezing the resulting material;
    (e) thawing the material;
    (f) immediately predrying the thawed material by evaporation to reduce the moisture content to a range of about 35 to 46%, thereby producing potato cells which are separated into single units or cell aggregates;
    (g) thereafter granulating the predryed material under conditions such that the moisture content remains within the range specified in step (f) during the entire granulating operation; and (h) drying the potato granules at a temperature and for a period of time to reduce the moisture content to not more than about 7%.

2. The method of claim 1 comprising the additional step of sulphiting the potatoes after step (a) and before step (b).

3. The method of claim 2 wherein the sulphiting step comprises soaking the prepared potatoes in a sodium bisulphite solution.

4. The method of claim 1 comprising the additional step of sulphiting the potatoes during the mashing step.

5. The method of claim 1 comprising the additional step of adding a surfactant to the potatoes during the mashing step or just prior to the predrying step.

6. The method of claim 5 wherein the amount of surfactant added is between about 0.15 and about 0.3% of the weight of the cooked potato.

7. The method of claim 1 wherein the freezing step is carried out at a temperature of from about 0° to about −40° F.

8. The method of claim 1 wherein cooling is effected by forced circulation of air before freezing.

9. The method of claim 1 wherein the thawing step is carried out at an air temperature of from about 40° to about 90° F.

10. The method of claim 9 wherein the temperature of the potato material during thawing is not permitted to rise above about 50° F.

11. The method of claim 1 wherein the predrying step is begun before the potato material is completely thawed.

12. The method of claim 1 wherein the predrying is carried out in a stirred bed dryer wherein the material is simultaneously stirred and contacted with a hot air stream.

13. The method of claim 12 wherein the maximum lineal speed of the stirrer is 30–100 feet per minute.

14. The method of claim 12 wherein the temperature of the hot air stream is 100°–300° F.

15. The method of claim 14 wherein the superficial velocity of the hot air stream is 250–500 feet per minute.

16. The method of claim 12 wherein the granulating step is carried out in a stirred bed fluidizing unit using a higher rate of stirring, lower temperature and lower air velocity, as compared to the predrying step.

17. The method of claim 16 wherein the temperature of the air stream is 100°–150° F.

18. The method of claim 16 wherein the maximum lineal speed of the stirrer is 1000–1800 feet per minute.

19. The method of claim 16 wherein the superficial velocity of the air stream is 20–60 feet per minute.

20. The method of claim 18 wherein the maximum lineal speed of the stirrer is 1400 feet per minute.

21. The method of claim 19 wherein the superficial air velocity is 35–45 feet per minute.

22. The method of claim 1 wherein the granules leaving the granulator consist of at least 85% of particles smaller than 60 mesh.

23. The method of claim 16, wherein the air velocity of the hot air stream employed in the predrying step is adjusted so that particles of potato material will be carried over automatically from the stirred bed dryer of the predrying step to the stirred bed fluidizing unit of the granulating step when the moisture content of the mash particles has been reduced to within the range of about 35 to 46%.

24. The method of claim 1, wherein the mash is predried in step (f) to a moisture content between 42 and 46%.

* * * * *